(12) United States Patent
Gorodetski et al.

(10) Patent No.: US 10,225,521 B2
(45) Date of Patent: Mar. 5, 2019

(54) SYSTEM AND METHOD FOR RECEIPT ACQUISITION

(71) Applicant: SharingPrices Ltd., Jerusalem (IL)

(72) Inventors: Reuven Gorodetski, Petach-Tikva (IL); Ariel Shiftan, Mizpe Yericho (IL)

(73) Assignee: SharingPrices Ltd., Jerusalem (IL)

( * ) Notice: Subject to any disclaimer, the term of this patent is extended or adjusted under 35 U.S.C. 154(b) by 143 days.

(21) Appl. No.: 14/413,784

(22) PCT Filed: Jul. 7, 2013

(86) PCT No.: PCT/IB2013/001468
§ 371 (c)(1),
(2) Date: Jan. 9, 2015

(87) PCT Pub. No.: WO2014/009786
PCT Pub. Date: Jan. 16, 2014

(65) Prior Publication Data
US 2015/0172603 A1    Jun. 18, 2015

Related U.S. Application Data

(60) Provisional application No. 61/669,676, filed on Jul. 10, 2012.

(51) Int. Cl.
H04N 7/18     (2006.01)
G06K 9/32     (2006.01)
G06Q 30/04    (2012.01)
G06K 9/18     (2006.01)
G06T 11/60    (2006.01)

(52) U.S. Cl.
CPC ............... *H04N 7/18* (2013.01); *G06K 9/18* (2013.01); *G06K 9/3258* (2013.01); *G06Q 30/04* (2013.01); *G06T 11/60* (2013.01)

(58) Field of Classification Search
CPC ........ G06Q 30/04; G06K 9/3258; G06K 9/18; H04N 7/18; G06T 11/60
USPC .......................................................... 348/61
See application file for complete search history.

(56) References Cited

U.S. PATENT DOCUMENTS

| | | | |
|---|---|---|---|
| 6,449,384 B2* | 9/2002 | Laumeyer | G06K 9/00818 382/104 |
| 2001/0043717 A1* | 11/2001 | Laumeyer | G06K 9/00818 382/104 |
| 2004/0083134 A1* | 4/2004 | Spero | G06Q 20/20 705/16 |
| 2005/0103856 A1* | 5/2005 | Zhu | G06K 7/10732 235/462.22 |
| 2010/0331043 A1* | 12/2010 | Chapman | G01C 21/20 455/556.1 |

(Continued)

*Primary Examiner* — Nguyen T Truong

(57) ABSTRACT

Systems and methods are presented for acquisition of receipt information using portable scanning devices such as a cellphone camera running suitable software. A smartphone having associated software is used to capture image from a receipt, by holding the smartphone camera over the receipt such that the latter is within the field of view of the cellphone camera. The software may be adapted to automatically identify receipts when such appear in the camera's field of view, and to automatically capture images. Compositing multiple images, image stitching, and OCR are all employed as necessary by the system to extract textual information from receipts.

25 Claims, 1 Drawing Sheet

(56) References Cited

U.S. PATENT DOCUMENTS

2011/0216192 A1\* 9/2011 Leung .................... H04N 5/225
  348/143

\* cited by examiner

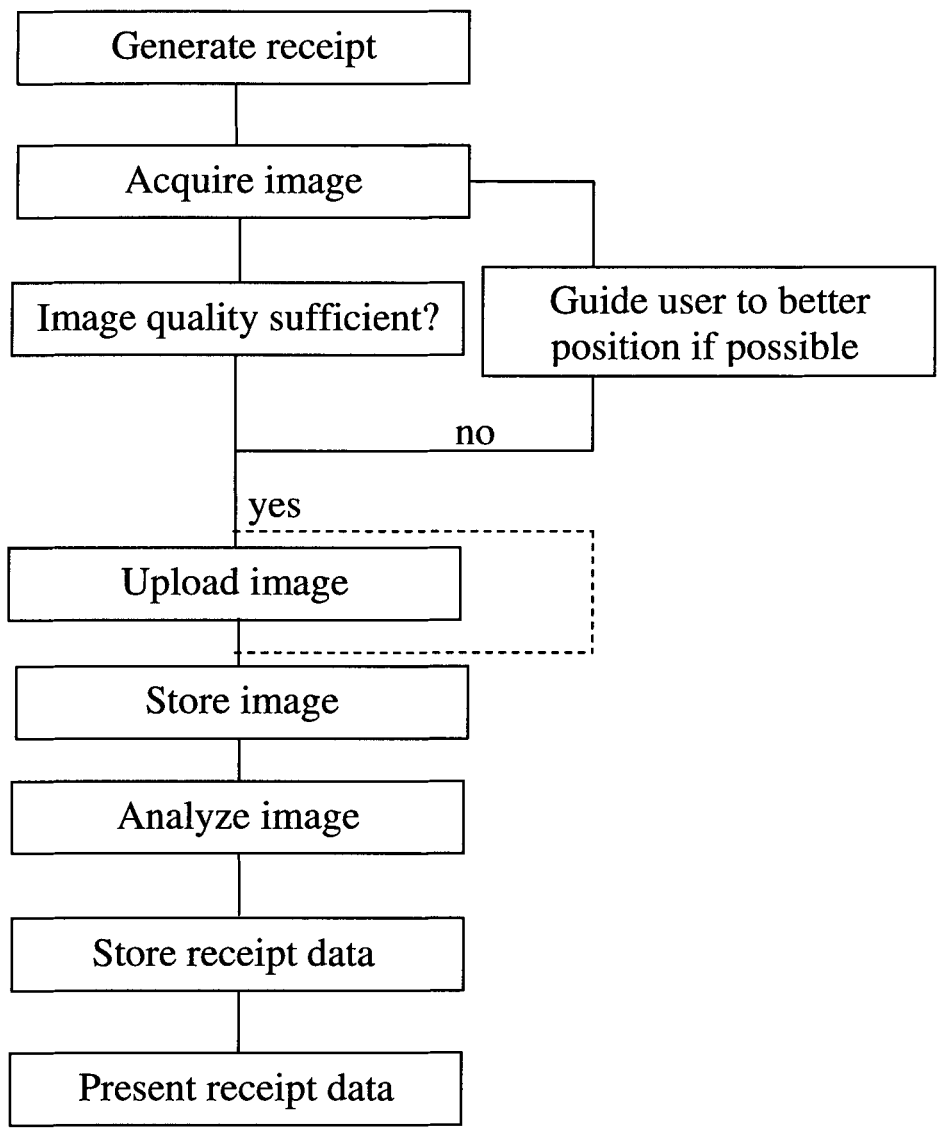

SYSTEM AND METHOD FOR RECEIPT ACQUISITION

CROSS-REFERENCE TO RELATED PATENT APPLICATIONS

This application is a U.S. National Phase Application under 35 U.S.C. § 371 of International Patent Application No. PCT/IB2013/001468, filed Jul. 7, 2013, and claims the benefit of priority under 35 U.S.C. Section 119(e) of U.S. Application Ser. No. 61/669,676, filed Jul. 10, 2012, all of which are incorporated by reference in their entireties. The International Application was published on Jan. 16, 2014 as International Publication No. WO 2014/009786 A1.

BACKGROUND

Technical Field

Embodiments of the present invention relate generally to systems and methods for receipt acquisition.

Description of Related Art

Receipts abound in our daily lives. Only the most scrupulously fastidious save receipts, invoices, bills and the like for various purposes such as tax reporting, expense tracking, etc. since the bother involved with collecting these scraps of paper generally outweighs the benefit in most people's estimation.

Hence, an improved method for acquiring information from receipts is a long felt need.

BRIEF SUMMARY

An aspect of the present invention provides a system for receipt image acquisition and analysis comprising: at least one image acquisition device; an image analysis means comprising a non-transitory computer-readable medium storing processor executable instructions on at least one computing device, adapted to: receive said scanned receipt; extraction of the textual information of the receipt; analyze said scanned receipt; present analyzed information to at least one user wherein said image acquisition device is in electronic communication with said image analysis means adapted for analysis of receipt images.

It is further within the provision of the invention to comprise a portable device and a remote server wherein said computing devices are in electronic communication with each other and adapted to divide between them the steps of receive said scanned receipt; extraction of the textual information of the receipt; analyze said scanned receipt.

It is further within provision of the invention to be further adapted to select a single frame of a realtime or near-realtime video series that scores beyond predetermined thresholds of quality parameters.

It is further within provision of the invention to perform the on a remote server.

It is further within provision of the invention to comprise image analysis means further adapted to use a combination of at least two frames in order to create a higher-quality composite image having an image quality greater than would be otherwise available.

It is further within provision of the invention to further comprise a non-transitory computer-readable medium storing processor executable instructions on a computing device, adapted to instruct the user for optimal or near-optimal image capture.

An aspect of the present invention provides a system for receipt image acquisition and analysis comprising an image acquisition device in electronic communication with image analysis means adapted for analysis of receipt images.

It is further within provision of the invention wherein said image acquisition device is selected from the group consisting of: smartphone; PDA; laptop computer; notebook computer; netbook; cellphone; tablet device; pad device, or other portable device.

It is further within provision of the invention wherein said image analysis comprises real time algorithms running on the same device hosting said image acquisition means, said image analysis adapted to guide the device holder to obtain images of a desired quality.

It is further within provision of the invention wherein said device may provide feedback to the user by means of graphical icons, graphic or written instruction, voice, speech, or any other voice gesture.

It is further within provision of the invention wherein said image analysis means comprises algorithms selected from the group consisting of: classification algorithms; segmentation algorithms; OCR algorithms.

It is further within provision of the invention wherein said image analysis means comprises a networked server adapted to receive and analyze images from said image acquisition device, and to provide information concerning said image analysis through networked means.

It is further within provision of the invention wherein said image analysis means comprises image compositing means adapted to create composite images from multiple individual images.

It is further within provision of the invention wherein said multiple individual images comprise areas of overlap for creation of higher quality images.

It is further within provision of the invention wherein said multiple individual images comprise areas not overlapping for creation of images of larger field of view.

It is further within provision of the invention wherein said image analysis means is adapted to activate said image acquisition device based on parameters of images acquired, sad parameters selected from the group consisting of: resolution, contrast, field of view, depth of field, clarity.

It is further within provision of the invention wherein said image analysis means is adapted to extract textual data from said receipt and store this data.

It is further within provision of the invention further providing means for storing and displaying data extracted from said receipt.

It is within provision of the invention to provide a method for receipt image acquisition and analysis comprising steps of:

acquiring images by means of an image acquisition device;

analyzing images by means of software running on hardware in electronic communication with said image acquisition device.

These, additional, and/or other aspects and/or advantages of the present invention are: set forth in the detailed description which follows; possibly inferable from the detailed description; and/or learnable by practice of the present invention.

BRIEF DESCRIPTION OF THE DRAWINGS

In order to understand the invention and to see how it may be implemented in practice, a plurality of embodiments will now be described, by way of non-limiting example only, with reference to the accompanying drawings, in which:

FIG. 1 illustrates a flow chart of one embodiment of the invention.

DETAILED DESCRIPTION

The following description is provided, alongside all chapters of the present invention, so as to enable any person skilled in the art to make use of said invention and sets forth the best modes contemplated by the inventor of carrying out this invention. Various modifications, however, will remain apparent to those skilled in the art, since the generic principles of the present invention have been defined specifically to provide a means and method for providing a system and method for receipt acquisition.

In the following detailed description, numerous specific details are set forth in order to provide a thorough understanding of embodiments of the present invention. However, those skilled in the art will understand that such embodiments may be practiced without these specific details. Just as each feature recalls the entirety, so may it yield the remainder. And ultimately when the features manifest, so an entirely new feature be recalled. To justly and entirely describe renditions of each embodiment may not yield full reportage of underlying concepts. Thus we must generally admit that not all embodiments are necessarily described herein, but that the concepts underlying the invention are themselves disclosed.

Reference throughout this specification to "one embodiment" or "an embodiment" means that a particular feature, structure, or characteristic described in connection with the embodiment is included in at least one embodiment of the invention.

The term 'receipt' refers hereinafter to any itemized transaction list such as a list of items purchased at a store; bills, invoices, or the like are included, all of which will usually include item identification information and item price information. Generally such receipts are printed on pieces of paper or other media and dispensed during sales. Within the definition are further included items such as financial worksheets and other financial documents, and other documents containing information of potential interest.

The invention comprises a system and method for acquisition of receipt information using portable scanning means such as a cellphone camera running suitable software. For example, a smartphone having software associated with the invention may be used to capture information associated with a receipt by holding the smartphone camera over the receipt such that the latter is within the field of view of the cellphone camera. In some embodiments the software is adapted to automatically identify receipts when such appear in the field of view, and to automatically capture images thereof, analogous to the action of QR code readers as will be familiar to those skilled in the art.

By means of software associated with the invention, the user need not know how to operate a conventional scanner; he or she simply waves the camera over the relevant documents, and the relevant portions thereof are captured by the camera.

It is within provision of the invention that devices such as smartphones, portable cameras, tablet computers, PDAs, notebook computers, netbooks, laptops, portable devices with camera and the like be used for purposes of carrying out steps in association with the inventive method.

The goal of the inventive system and method is to give the user an experience similar to that of barcode scanning with respect to rapidity and reliability of the method. As in barcode scanning, it is within provision of the invention that upon a successful scan the device emit an audible indication that the scan was successfully performed, allowing the user to advance to the next document.

It is within provision of the invention that the algorithm of the invention take advantage of various pieces of contextual information as may be available. By use of such information the system may maximize the quality of the results and decrease response time, as detailed below. In addition, the algorithm can learn and improve its own performance.

Likewise, it is within provision of the invention that the system be capable of learning from multiple users and improving the entire system, as detailed below.

It is within provision of the invention that software associated with the invention select a single frame of a realtime or near-realtime video series that scores beyond predetermined thresholds of quality parameters such as focus, lighting, contrast, image relevance and so on. This selected frame (or frames) is then analyzed, either locally (e.g. on the cellphone by means of software adapted for this purpose) or remotely (e.g. on a server adapted to communicate with the cellphone, receive image data therefrom, and analyze it).

It is further within provision of the invention to use a combination of two or more frames in order to create a higher-quality composite image having an image quality (in terms of resolution, contract, or any number of other parameters) greater than would be otherwise available.

It is within provision of the invention to scan long receipts, invoices, bills or other documents having particularly large or small aspect ratios such as 10:1 or greater, or 1:10 or lesser by means of stitching together several individual images.

The software of the device may instruct the user as to where to place the camera for optimal image capture. For example, the camera may show the end of the previous picture enlarged, allowing the user to approximately match this section in the new image being acquired.

The image processing of the system and method involves extraction of the textual information of the receipt. This may be accomplished by means of OCR software, which employs various algorithms for the purpose of text data extraction from images; techniques for such are known in the art, and the limited scope of the printed information (generally comprising numbers and common short words) will render the analysis thereof simpler, as will be clear to one skilled in the art.

It is within provision of the invention that software associated with the method instruct the user to move the scanning device (e.g. cellphone) along an invoice which may be longer than can fit within the field of view of a single camera frame. The full resulting image may be created automatically by stitching together a number of sufficiently high quality frames that cover all the invoice area, resulting in a larger composite image made of the entire invoice. This method may be employed with multiple invoices as well to generate a single image of multiple invoices. Algorithms for such image stitching will be known to those skilled in the art.

It is within provision of the invention that the final image contains only the invoice in its original form. Algorithm(s) of the invention are utilized to make the right combination of frames captured as described above. This method also addresses the issues of segmentation/extraction of the visual invoice data from the image, alignment thereof, and correcting problems of three dimension rotations, translations, document problems such as stains, creases, folds, blurriness and the like.

While it is possible that through just one picture enough information may be obtained to carry out the subsequent image processing of the invention (such as OCR), it is within provision of the invention that several pictures, a movie or video sequence, or other information automatically collected may be employed to allow the system to achieve the maximum information processing ability in near real time or offline. Such multiple images may be used to achieve better resolution, contrast, brightness, field of view, depth of field or the like as will be clear to one skilled in the art.

It is within provision of the invention that the image acquisition device(s) of the invention such as smartphones be provided with image processing means such as OCR software or other specialized image processing capability. Alternatively or additionally such processing means may be provided running on a server associated with the invention, to which images and/or other information from the smartphone or other device of the invention may be sent. As this server may comprise dedicated high-bandwidth and high-speed processing capabilities, sophisticated image processing means may be employed such classification algorithms including but not limited to support vector machines, neural networks, statistical classification, variable kernel density estimation, one-dependence estimators, Boosting, Cascading classifiers, case-based reasoning, clustering, decision boundary method, decision tree learning, evolving classification function, feature learning, generalization error, information gain ratio, K-nearest neighbor algorithm, kernel methods, learning vector quantization, linear classifier, margin classifier, Monte Carlo, Multi-label classification, Bayes classifier, nearest neighbor search, optimal discriminant analysis, perceptron, quadratic classifier, radial basis function network, winnowing, and the like.

Other algorithms may be employed, for example for recognition of receipts in scenes and recognition of letters, numbers, words, logos, graphical codes and other material on receipts. Algorithms suitable for such jobs will be clear to one skilled in the art.

It is within provision of the invention that acquisition of visual information can be made from paper or from any other source that shows the document, for example a computer screen, projection image, or the like.

It is within provision of the invention that other documents than receipts be scanned and analyzed by the system, including but not limited to invoices, financial documents, and documents in general.

It is within provision of the invention that indication be provided on the fly to the user concerning the status of the scan, for example by means of marking of edges or boundaries of invoices, and/or indication of fault conditions such as not enough light, unstable camera platform, distance from camera to document too great, distance from document to camera too small, lack of receipt in frame, receipt not recognized, logo missing, and the like.

It is within provision of the invention that that there be a preview mode allowing a scan to be reviewed by the user for confirmation, correction or the like.

It is within provision of the invention that the algorithm perform image analysis on the fly, or to do so offline after scanning. Automatic classification may be performed at several levels by various implementation of the invention:
  Categorization of the document
  Categorization of the place of business (Automotive/Banking/restaurants, etc.)

The algorithm used by the system can be a learning algorithm and/or artificially intelligent algorithm for several goals:
  Learning of the classification categories of user
  Improving the quality and speed of acquisition by the degree
  Learning user behavior in the purchase (for example—stability)
  Learning types of documents scanned by the user usually parameters and quality of specific hardware (resolution, sensor quality, flash, etc.)
  Learning from user feedback—for instance if the user decides to rescind the image, or change the classification obtained, or change any other parameter of the acquisition process.

Learning may in some embodiments be implemented on the local machine; in some embodiments the learning or other algorithms will run on system level data and may be implemented on servers, for example. It is within provision of the invention to use various hardware parameters using data collected from users of this hardware, improve classification by use of feedback from users of the product, and the like.

In addition to other information gleaned, location information may be transmitted by the user smartphone. This will allow use of positional context, for example by means of knowing in which country a user is using the application, a likely language or languages of receipt or document may be predicted and used as initial guess for OCR or other operations of the software as the case may be.

It is within provision of the invention that the algorithm utilize several features for the input so that one may obtain information of interest to improve image data, allow for data repair, and possibly utilize qualitative information gathered. For this purpose it is within provision of the invention to utilize unique characteristics of invoices and documents, including prior knowledge of:
  Colors—usually black on white
  Document shape (usually rectangular)
  Logo
  Date and Time
  Business name
  Most invoices will have certain details, such as a body built of 2-4 columns having some of the following characteristics:
  Product Description
  amount
  Price
  Barcode At the end of the process, the software will allow for reporting a summary of the prices, items, and the total amounts with descriptions, tax, how much was paid and what payment methods were used, and the like.

It is within provision of the invention to utilize information on existing products in every business (if using classification).

It is within provision of the invention that information on the specific invoice structure of each business be utilized and/or stored.

It is within provision of the invention to use location data (GPS) to help in acquiring the image (for instance by reducing the scope of search space parameters).

It is within provision of the invention that databases of product codes such as SKU codes and barcodes be utilized to identify and/or verify receipt information, which will be of utility when the text description in a receipt may be lacking or deficient but other encoded information (such as SKU or barcode) is available. It is within provision of the invention to use a dictionary, rules of the language(s) involved, receipt statistics, and statistics on common words for more informed analysis of the receipt text.

It is within provision of the invention that a custom OCR dictionary be used for the OCR algorithms of the invention. This dictionary be small and adjusted to a particular purchase situation.

It is within provision of the invention that an option for use of a camera's flash be included, automatically if needed. It is within provision of the invention that automatic adjustment of parameters of the flash be utilized to improve image acquisition.

After a purchase is made and a receipt scanned on the device, repairs and other image manipulations including addition and/or removal of information can be made on the device or on another machine (such as a pc connected to a server through a web page).

In FIG. 1 a simplified flowchart consistent with certain embodiments of the invention is shown. After a receipt has been generated or otherwise obtained, an image is acquired by the imaging means of the system. Once an image containing receipt data has been obtained, software associated with the invention will determine whether the image quality is sufficient (as judged for instance in terms of thresholds of resolution, brightness, contrast, blurriness, and the like).

If the image is determined to be of insufficient quality, subsequent images are captured until one image or a composite of several images is determined to be of sufficient quality for OCR analysis. At this point the image or composite is optionally uploaded to a server and then analyzed. This analysis as mentioned above may comprise specialized OCR that has been adapted to the particular task of receipt analysis.

Once the stage of image analysis has been accomplished, the receipt data (in the form of textual and numerical data, for instance) may be stored for instance on a server associated with the invention, and may further be presented to the user in the form of a spreadsheet, table, or the like.

In some embodiments of the invention, the scanning process may be integrated with a game or game like process. In some embodiment of the invention such a game may comprise an augmented reality allowing the user to view the receipt in the background of the screen and other objects on top of said background hence allowing the system to instruct the user regarding all available parameters in a fun or interesting way. Said parameters may include scanning speed, required pauses, stability issues etc.

In one embodiment of the invention, the system may comprise scanning while playing in an augmented reality-scenario wherein the user has to balance an acrobat on a rope using movement of the scanning device containing movement sensors, accelerometers etc., while the balancing game is actually a feedback driving the user to balance the scanning process in different parameters such as speed, stability, straight line movement etc.

In other embodiments, the game will not contain augmented reality scenario but a game graphic that may or may not be based upon the actual pictures or video captured by the scanning device.

In some embodiments of the invention a system for receipt image acquisition and analysis comprising:
at least one image acquisition device;
an image analysis means comprising a non-transitory computer-readable medium storing processor executable instructions on at least one computing device, adapted to:
receive said scanned receipt;
extraction of the textual information of the receipt;
analyze said scanned receipt;
present analyzed information to at least one user;
wherein said image acquisition device is in electronic communication with said image analysis means adapted for analysis of receipt images.

In some embodiments of the invention, the computing devices may be comprised of a portable device and a remote server wherein said computing devices are in electronic communication with each other and adapted to divide between them the steps of receive said scanned receipt; extraction of the textual information of the receipt; analyze said scanned receipt. This will allow the user and/or the system to determine which of the computing devices will perform each mission, this functionality may allow, for example, for stronger servers to perform high level OCR or for example, may allow less high level OCR by the portable computing device to be performed when the server is busy.

In some embodiments, the system of may further comprise a non-transitory computer-readable medium storing processor executable instructions on a computing device, adapted to instruct the user for optimal or near-optimal image capture.

Although selected embodiments of the present invention have been shown and described, it is to be understood the present invention is not limited to the described embodiments. Instead, it is to be appreciated that changes may be made to these embodiments without departing from the principles and spirit of the invention, the scope of which is defined by the claims and the equivalents thereof.

What is claimed is:

1. A system for document image acquisition and analysis comprising:
at least one image acquisition device for scanning a document; and
an image analysis means comprising a non-transitory computer-readable medium storing processor executable instructions on at least one computing device, adapted to:
receive a real-time or near-real-time video of said scanned document;
select at least two single frames of said video, said at least two single frames are scored beyond predetermined image quality parameters thresholds;
combine said at least two single frames to a composite image having a higher image quality than each of said at least two single frames;
extract textual information of the document, using said composite image;
analyze said scanned document from said extracted textual information; and
present analyzed information to at least one user;
wherein said image acquisition device is in electronic communication with said image analysis means adapted for analysis of document images.

2. The system of claim 1 wherein said computing devices include a portable device and a remote server wherein said computing devices are in electronic communication with each other and adapted to divide between them the steps of receive said scanned document, select said at least two single frames, combine said at least two single frames, extract the textual information of the document and analyze said scanned document.

3. The system of claim 1 wherein said selection is performed on a remote server.

4. The system of claim 1 further comprising a non-transitory computer-readable medium storing processor executable instructions on a computing device, adapted to instruct the user for optimal or near-optimal image capture.

5. The system of claim 1 wherein said image analysis means comprises a networked server adapted to receive and analyze images from said image acquisition device, and to provide information concerning said image analysis through networked means.

6. The system of claim 1 wherein said image analysis means comprises image compositing means adapted to create composite images from multiple individual images.

7. The system of claim 1 wherein said image analysis means is adapted to activate said image acquisition device based on parameters of images acquired, said parameters selected from the group consisting of: resolution, contrast, field of view, depth of field, clarity.

8. The system of claim 1 wherein said image analysis means is adapted to extract textual data from said document and store this data.

9. The system of claim 1 further providing means for storing and displaying data extracted from said document.

10. The system of claim 1 wherein the image acquisition process is integrated with a game or game like process.

11. The system of claim 10 wherein said game comprise augmented realty features.

12. A method for document image acquisition and analysis comprising steps of:
acquiring images of a real-time or near-real-time video by means of an image acquisition device scanning a document;
selecting at least two single frames of said video, said at least two single frames are scored beyond predetermined image quality parameters thresholds;
combining said at least two single frames to a composite image having a higher image quality than each of said at least two single frames;
extracting textual information of said document, using said composite image; and
analyzing said composite image from said extracted textual information by means of software running on hardware in electronic communication with said image acquisition device.

13. The method of claim 12 wherein said image analysis means comprises a networked server adapted to receive and analyze images from said image acquisition device, and to provide information concerning said image analysis through networked means.

14. The method of claim 12 wherein said image analysis means comprises image compositing means adapted to create composite images from multiple individual images.

15. The method of claim 14 wherein said multiple individual images comprise areas of overlap for creation of higher quality images.

16. The method of claim 14 wherein said multiple individual images comprise areas not overlapping for creation of images or larger field of view.

17. The method of claim 12 wherein said image analysis means is adapted to activate said image acquisition device based on parameters of images acquired, sad parameters selected from the group consisting of: resolution, contrast, field of view, depth of field, clarity.

18. The method of claim 12 further providing means for storing and displaying data extracted from said document.

19. The system of claim 1, wherein said image analysis means is further adapted to obtain location data of said at least one image acquisition device; and wherein said analysis of said scanned document is conducted using said location data to predict a language of said textual information.

20. The method of claim 12 further comprising the steps of:
obtaining location data of said image acquisition device; and
extracting textual information from the document;
wherein said analyzing said images is conducted by using said location data to predict a language of said textual information.

21. The system of claim 4, wherein said non-transitory computer-readable medium storing processor executable instructions for emitting an audible indication to said user as a result of a successful scan.

22. The system of claim 4, wherein said non-transitory computer-readable medium storing processor executable instructions for providing feedback to said user to guide said user to capture said document in said optimal or near-optimal image, wherein said feedback comprising at least one member of a group consisting of: graphical icons, graphic instructions, written instructions, voice, speech and voice gesture.

23. The system of claim 1, wherein said selection and said combining is conducted iteratively using sequential frames of said video until said composite image is determined to be of sufficient quality for Optical Character Recognition (OCR) analysis.

24. The method of claim 12, wherein said selecting and said combining is conducted iteratively using sequential frames of said video until said composite image is determined to be of sufficient quality for Optical Character Recognition (OCR).

25. The system of claim 1, wherein said image analysis is further adapted to improve image data and to repair data extracted from said document by utilizing unique characteristics of said document acquired from prior knowledge on said document.

\* \* \* \* \*